C. O. GUSTAVSEN.
CONVEYER.
APPLICATION FILED FEB. 5, 1907.

902,530.   Patented Oct. 27, 1908.

Witnesses
Stuart Hilder.
N. Curtis Lammond.

Inventor
Charles O. Gustavsen
By H. H. Bliss.
his Attorney

UNITED STATES PATENT OFFICE.

CHARLES O. GUSTAVSEN, OF COLUMBUS, OHIO, ASSIGNOR, BY MESNE ASSIGNMENTS, TO THE JEFFREY MANUFACTURING COMPANY, A CORPORATION OF OHIO.

CONVEYER.

No. 902,530.      Specification of Letters Patent.      Patented Oct. 27, 1908.

Original application filed April 27, 1906, Serial No. 313,998. Divided and this application filed February 5, 1907.
Serial No. 355,927.

*To all whom it may concern:*

Be is known that I, CHARLES O. GUSTAVSEN, citizen of the United States, residing at Columbus, in the county of Franklin and State of Ohio, have invented certain new and useful Improvements in Conveyers, of which the following is a specification, reference being had therein to the accompanying drawing.

This application which is a division of my application 313,998, filed April 27, 1906, is for an invention relating to screw conveyers for granular and other material.

The object of the invention is to provide a simple and effective spiral flight bearing and coupling device for screw conveyers, by means of which the continuity of the screw conveyer is preserved; the form of the invention constituting the subject of this application being particularly adapted for use in conveying material that is not of a gritty nature.

Figure 1:
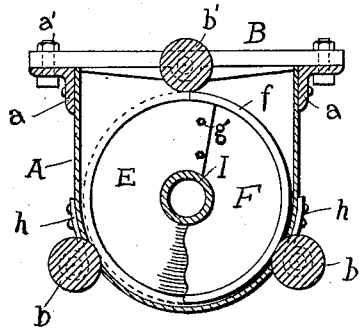
Figure 2:
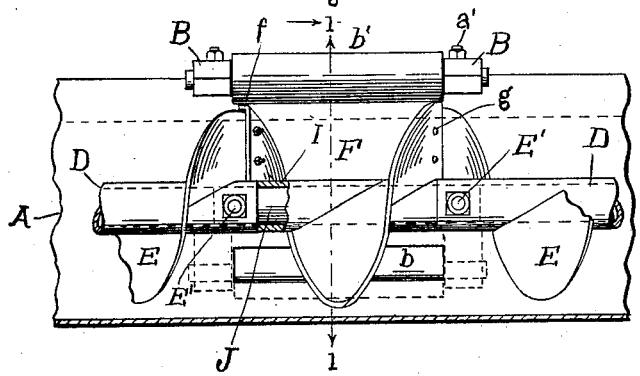
Figure 3:
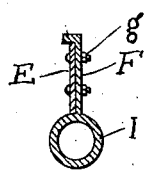

In the accompanying drawings—Figure 1 is a transverse sectional view of a conveyer embodying my invention, the section being taken on the line 1—1 of Fig. 2. Fig. 2 is a longitudinal sectional view, the screw conveyer being represented in side elevation, of a short section of the conveyer. Fig. 3 is a vertical section showing the union of the spiral flight bearing with the ordinary spiral of the conveyer.

The conveyer trough A is of any usual or preferred construction and may be supported in any well-known manner. At the place where two of the screw conveyer sections are to be coupled together, or at any other place where a bearing is desired, there are secured to the edges of the trough angle irons $a$. A transverse clamping bar B extends across the top of the conveyer trough and is united with the angle irons by bolts and nuts $a'$. The screw conveyer is formed of sections which may be of any usual or preferred construction, that represented in the drawings consisting of a screw or helical blade E, supported upon and extending around a shaft D, which is preferably hollow. The ends of the screw conveyer sections instead of being brought directly together end to end and united, as is usual, are separated, preferably the distance represented by the pitch of the conveyer, and there is situated in this space between the conveyer sections a spiral bearing section F. This is a short section of a spiral conveyer of a length to form one complete circumferential revolution of the spiral, and is preferably mounted upon a shaft I. The blade of the spiral bearing section is provided with a right angle peripheral flange or edge $f$, which serves as a tread of sufficient width to prevent unduly rapid wear, and that is arranged to rest upon or against a supporting bearing or bearings to be presently described. The ends of the section F are connected with the ends of the spiral conveyer sections in such way that the continuity of the screw conveyer is preserved. To secure this the section F is interposed between the ends of the conveyer sections, the shaft section I alining with the shaft sections D—D. These shaft sections being hollow may be united by a cylindrical coupling piece J that fits within the ends of the hollow shafts D, extends through the shaft I, and is united by bolts E' with the shafts D. The ends of the bearing and conveyer section F are secured to the ends of the spiral blades E at either side, as by bolts $g$—$g$.

It has heretofore been the common practice to support spiral or screw conveyers in bearings for the central shaft of the screw or helical flight. It is, however, often difficult to support or arrange such bearings, and I have therefore devised a bearing or support arranged to have the flight or screw conveyer rest directly thereupon and be supported directly thereby. Such a bearing can be carried by the conveyer trough and is easily applied. The bearing herein shown and claimed is of roller construction, and is especially adapted for use where material of a non-gritty character is being transported.

$b$ $b$ represent rollers mounted in suitable bearings $h$, secured to the outside of the conveyer trough, the rollers being disposed with their axes parallel with the axis of the conveyer, and being arranged to extend through openings C in the conveyer trough, so that the peripheries of the rollers extend a little inside the inner face of the wall of the trough A. Upon these rollers rests the flange $f$ of the intermediate bearing section F of the conveyer. In order to hold the conveyer down upon the bearing rollers $b$, and thus cause it to run smoothly and steadily, I employ a roller bearing $b'$, which is disposed directly above and parallel with the shaft section I, and cause it to bear upon the flange $f$ of the bearing section from above. This roller $b$ is supported by the transverse clamping bars B. The supporting rollers $b$ $b'$ are preferably of the same length as the spiral flight bearing F. It will be understood that rollers of larger or smaller diameter may be used for varying the height at which the flight bearing is supported above the bottom of the trough.

What I claim is:

1. In a screw conveyer, the combination with a trough and a screw or helical conveyer arranged to rotate therein, of a rolling support or bearing situated in the lower part of the trough upon which the edge of the helical conveyer rests and by which it is supported, substantially as set forth.

2. In a screw conveyer, the combination with a trough and a screw or helical conveyer arranged to rotate therein, of a rolling support or bearing situated in the lower part of the trough upon which the edge of the helical conveyer rests and by which it is supported, and means for holding the helical conveyer down upon the said rolling bearing, substantially as set forth.

3. In a screw conveyer, the combination with a trough and a screw or helical conveyer arranged therein, of a pair of rollers situated in the lower part of the trough and upon opposite sides of the axis of the conveyer, upon which rollers the periphery or edge of the helical conveyer rests, and a roller situated above the axis of the conveyer and bearing upon the peripheral edge thereof for holding it down upon the said bearing rollers, substantially as set forth.

4. In a screw conveyer, the combination with two alining flight sections and a trough in which they are mounted, of a helical flight bearing interposed between the ends of the said flight sections and comprising a section of the helical conveyer, a rolling support carried by the trough upon which the said helical flight bearing rests, and means for holding the said bearing down upon the said rolling support, substantially as set forth.

5. In a screw conveyer, the combination with two alining flight sections and a trough in which they are mounted, of a helical flight bearing interposed between the ends of the flight sections and uniting them, the said flight bearing being provided with a peripheral flange $f$, and a rolling bearing or support upon which the flange of the said flight bearing rests, substantially as set forth.

6. In a screw conveyer, the combination with a trough and a screw or helical conveyer arranged to rotate therein, of a pair of rollers situated in the lower part of the trough and upon opposite sides of the axis of the conveyer, upon which rollers the periphery or edge of the helical conveyer rests, substantially as set forth.

7. In a screw conveyer, the combination with two alining flight sections and a trough in which they are mounted, of a helical flight bearing, interposed between the ends of the said flight sections and comprising a section of the helical conveyer, and a rolling support carried by the trough upon which the said helical flight bearing rests, substantially as set forth.

In testimony whereof I affix my signature, in presence of two witnesses.

CHARLES O. GUSTAVSEN.

Witnesses:
WALTER M. TEAGUE,
F. H. CHURCH.